United States Patent
Määttänen

(10) Patent No.: US 6,365,854 B1
(45) Date of Patent: Apr. 2, 2002

(54) TELESCOPIC COVER STRUCTURE OF AN ELECTRICAL DEVICE

(75) Inventor: Mikko Määttänen, Märynummi (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/469,004

(22) Filed: Dec. 21, 1999

(30) Foreign Application Priority Data

Dec. 22, 1998 (FI) ................................................ 982773

(51) Int. Cl.⁷ ............................................... H04M 1/00
(52) U.S. Cl. ........................... 200/61.71; 200/61.58 R; 200/333; 200/51.09; 379/433
(58) Field of Search ................. 200/50.01, 50.02, 200/50.1, 51 R, 51.02, 51.03, 51.09, 51.12, 52 R, 61.58 R, 61.62, 61.71, 61.72, 61.74, 330–333, 292; 343/702, 866, 871, 872, 883, 906; 379/433, 440

(56) References Cited

U.S. PATENT DOCUMENTS

| | | | |
|---|---|---|---|
| 4,897,873 A | 1/1990 | Beutler et al. | 379/433 |
| 5,151,946 A * | 9/1992 | Martensson | 379/38 |
| 5,170,173 A | 12/1992 | Krenz et al. | 343/702 |
| 5,335,274 A * | 8/1994 | Masuda et al. | 379/433 |
| 5,461,672 A * | 10/1995 | Enokido et al. | 379/433 |
| 5,561,437 A | 10/1996 | Phillips et al. | 343/702 |
| 5,657,370 A * | 8/1997 | Tsugane et al. | 455/550 |
| 6,073,027 A * | 6/2000 | Norman et al. | 455/550 |
| 6,151,485 A * | 11/2000 | Crisp | 455/90 |

FOREIGN PATENT DOCUMENTS

| | | |
|---|---|---|
| EP | 0792055 A2 | 8/1997 |
| WO | WO 97/26713 | 7/1997 |

* cited by examiner

Primary Examiner—Michael Friedhofer
(74) Attorney, Agent, or Firm—Perman & Green, LLP

(57) ABSTRACT

A cover structure for the cover of an electronic device where a first part is movable in relation to a second part is described. The first part comprises a certain electrical component (303, 503) and means (307, 308, 309, 506, 507, 508, 509, 510) for forming an electrically conducting connection between the first and second parts. The first part comprises an outer cover part (301, 501) and an inner cover part (302, 502) of substantially the same size, whereby the electrical component is located between the inner cover part and the outer cover part. Further the first part comprises slide conductors (308, 309, 506, 507) on such a surface of the inner cover part which is not against the outer cover part.

9 Claims, 4 Drawing Sheets

TELESCOPIC COVER STRUCTURE OF AN ELECTRICAL DEVICE

TECHNOLOGICAL FIELD

The invention relates generally to cover structures of electrical devices where two cover parts are intended to be movable in relation to each other. Particularly the invention relates to such a structure where further an electrical contact must be arranged between the different parts of the cover structure.

BACKGROUND OF THE INVENTION

Small-sized electronic devices which are intended to be easily portable by a person often have a transport position and an operating position. As an example we examine a mobile phone 100 provided with a telescopic cover according to the FIG. 1. For transport the lower part 101 of the cover is in a position shown in the figure by a continuous line. For operation it can be slid in the direction of the arrow into the position 101' shown by the broken line, whereby the distance between the microphone 102 an d t he speaker 103 better corresponds to the distance between the mouth and ear of a typical user.

In the mobile phone of FIG. 1 the microphone 102 is located in the movable lower part of the cover. There are also known mobile phones where the speaker is located in a part which can be moved in relation to the rest of the mobile phone. Such structures are characterised in that there must be an electrically conducting connection between the mutually movable parts. Often very stringent requirements are placed on the electrical characteristics of the connection. For instance in the structure of the FIG. 1 the microphone 102 must operate equally well irrespective of the mutual positions of the cover parts, and the function must remain unchanged irrespective of a high number of cover opening and closing, operations.

FIG. 2 shows a known cover structure which can be used to realise an electrically conducting connection for the microphone in a structure according to the FIG. 1. The structure comprises a cover part 201 and a microphone bracket 202. The microphone 203 is mounted between the cover part and the bracket so that its sound sensitive spot is aligned with the hole 204 in the cover. Before the microphone is mounted it is soldered to conductor areas on the surface of a flexible printed circuit foil 205 or a so called flex. The flex further comprises an elongated section and on its surface parallel elongated conductor areas 206 and 207, from which there is a connection to the microphone. The elongated section of the flex is glued to the inner surface of the cover part, so that the conductor areas 206 and 207 are left visible. The microphone bracket 202 is fastened over the microphone, for instance by ultrasonic welding of its edges to the inner surface of the cover part. Isolating rings 208 and 209 are used in order to isolate the microphone from mechanical vibrations of the cover. When the cover assembly is finished it is attached to the mobile phone by guide bars 210. The mobile phone must have two parallel contact springs which are pressed against the elongated conductor areas 206 and 207 and which form the electrical connection from the microphone to other electrical parts of the mobile phone.

Disadvantages of the structure presented in FIG. 2 are i.a. the required ultrasonic welding or some other fastening step, which is relatively complicated to realise, and the high accuracy of the positioning, which is required for fastening the flex at the exactly correct position. Further, the elongated conductor areas of the flex must be coated by some method which ensures a high mechanical wear resistance and an excellent electrical contact, irrespective of the position the telescopic cover of the mobile phone. The cost of the coating in the known solutions is up to 80 % of the total manufacturing costs of the flex.

SUMMARY OF THE INVENTION

The object of the present invention is to present a structure of the telescopic cover of an electrical device which is advantageous regarding the assembly. A further object of the invention is to present a structure where the electrical connection between two mutually movable cover parts can be realised advantageously and reliably.

The objects of the invention are attained by using a two-layer structure in the movable cover part, so that the parts of the movable cover part are attached to each other by form-fitting joints and at the same time act as a holder for electrical components placed between them. The inner layer of the cover structure acts as a bracket for the slide conductors which form the electrical contact between the mutually movable parts.

The structure according to the invention is characterised in that it comprises an outer cover part and an inner cover part of substantially the same size, whereby a certain electrical component is located between the outer cover part and the inner cover part, and slide conductors on such a surface of the inner cover part which is not against the outer cover part.

According to the invention the movable cover part of the electrical device comprises an outer cover part and an inner cover part which are fastened to each other, most preferably by a form-fitting joint. The cover parts can be shaped so that spaces exactly of a desired size and shape are left between them for electrical components or for other separately mounted components, whereby no separate brackets are required for these components.

In order to form the electrical contact between the movable cover part and some other part there are used slide conductors which are fastened to the inner cover part. They can be made of a flexible printed circuit foil or of separate metal strips. The slide conductors can also be made into the inner cover part as so called inserts if extrusion or a corresponding method is used to manufacture the inner cover part. If the slide conductors are located separated from such electrical components which must have an electrically conducting connection from the conductors, then a conductor component made of a flexible printed circuit foil or any other suitable material can be located between the cover parts so that it forms the required electrical connections.

Thanks to the invention the movable cover part of the electrical device can be assembled even totally without soldering, ultrasonic welding or other operating steps which are difficult to automate, and this is particularly advantageous regarding the assembly. If the slide bars are made of separate metal strips it is possible to use such advantageous coating methods which ensure wear resistance and a good electrical contact, which methods are not suitable for a flexible printed circuit foil. Then substantial savings are obtained in comparison to the coating of a prior art flexible printed circuit foil.

BRIEF DESCRIPTION OF DRAWINGS

The invention is described in more detail below with reference to preferred embodiments presented as examples and to the enclosed figures, in which.

Figure 1:
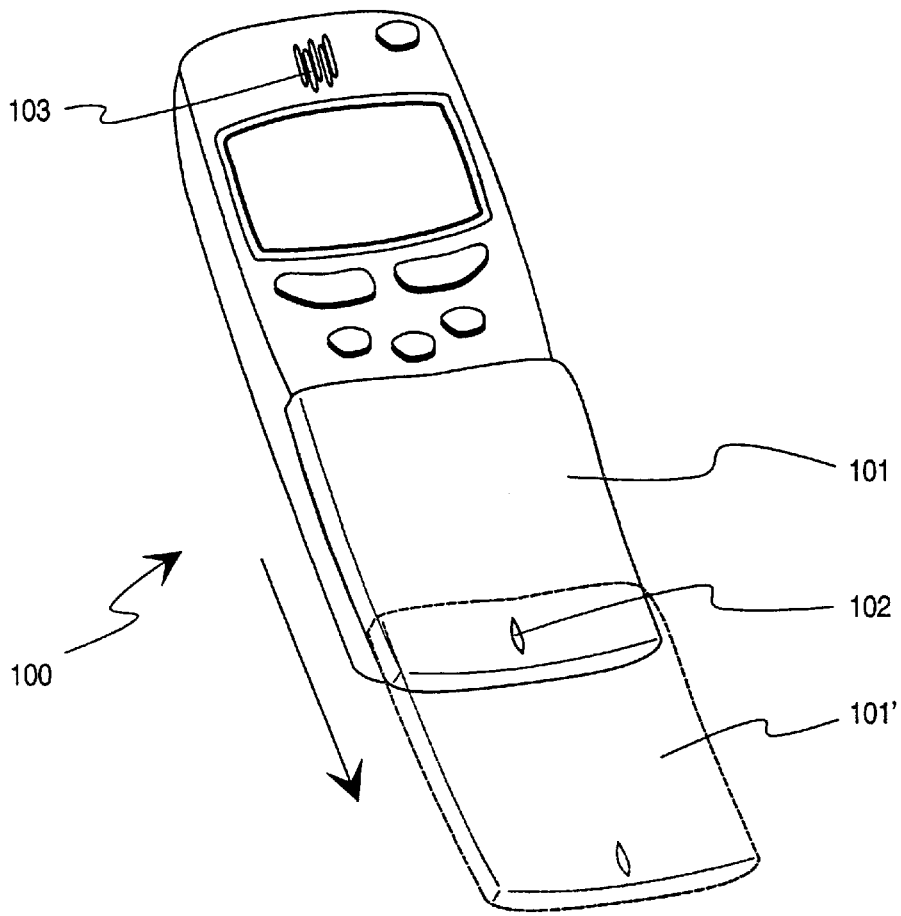
FIG. 1 shows a known mobile phone with a telescopic structure.
Figure 2:
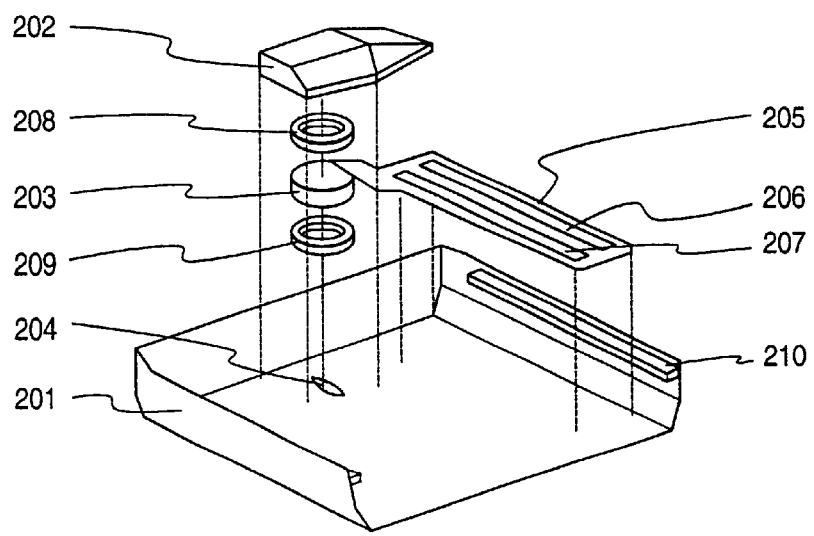
FIG. 2 shows a known cover structure.

Above, in connection with the description of the prior art, reference was made to the FIGS. 1 and 2, so in the following description of the invention and its preferred embodiments reference is made primarily to the FIGS. 3 to 6. The same reference numerals are used for corresponding parts in the figures.

DETAILED DESCRIPTION OF THE INVENTION

Figure 3:
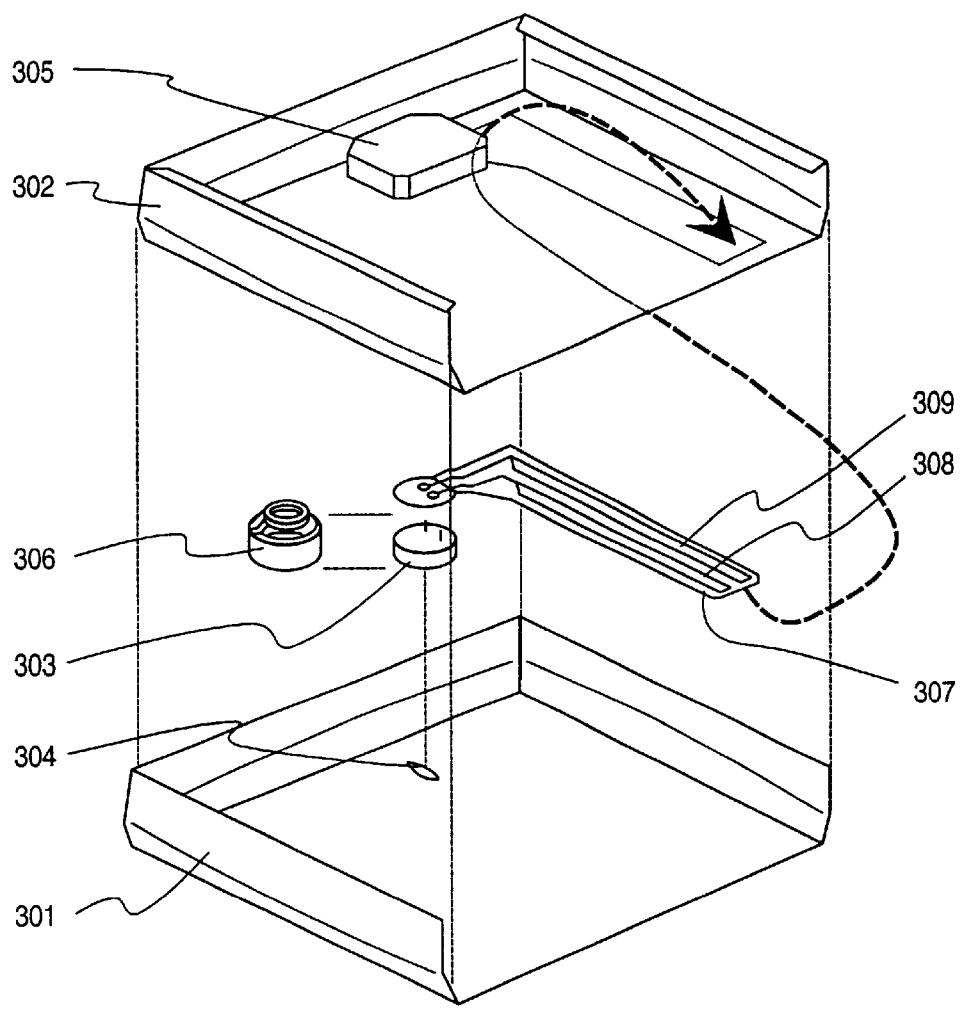
FIG. 3 shows a cover structure according to the invention.

FIG. 3 is an exploded view showing the parts belonging to the cover structure of an advantageous embodiment of the invention. The main parts of the cover are the outer cover part 301 and the inner cover part 302. According to a preferred embodiment of the invention the outer cover part 301 is made of metal by embossing and the inner cover part is made of plastics by injection moulding. However, the invention does not actually limit the selection of the manufacturing material of the cover parts, as long as the materials are sufficiently rigid in order to form a formfitting joint between the inner cover part and the outer cover part. A form-fitting joint means according to the general practice a joint where two or more parts are joined so that only mechanical, mutually corresponding fastening forms are locked into each other. The form-fitting joint between the cover parts 301 and 302 is described in more detail below.

In FIG. 3 it was assumed that the movable part of the electrical device comprises a microphone 303 which has a cylindrical form and is intended to be mounted so that one end surface of the cylinder is aligned with the sound opening 304 in the outer cover part 301. The inner cover part comprises a shaped location 305 which is so shaped, that when the cover parts 301 and 302 are fastened to each other there is left a space between them with a size and shape substantially corresponding to the microphone, whereby the space is defined by surfaces which act as a bracket for the microphone. In order to support the microphone in its place and to isolate it from external mechanical vibrations a capsule 306 made of elastic material is placed around it. At that end surface of the microphone which is not placed against the sound opening there are the electrical interfaces which are soldered to connecting spots on the flexible printed circuit foil 307. The flexible printed circuit foil 307 comprises also elongated conductor areas 308 and 309, from which there are connections to the connecting spots, either directly or via some connecting components. The connecting components can be for instance resistive, capacitive and/or inductive components, which are formed by strip techniques on the surface of the flexible printed circuit foil or connected to certain connection spots on it.

That part of the flexible printed circuit foil which contains the elongated conductor areas 308 and 309 are slipped from the microphone space through the gap in the inner cover part to the other side of the inner cover part, according to the broken line arrow shown in FIG. 3, whereby, regarding the position shown in FIG. 3, the microphone with its isolating capsule is left below the inner cover part and the elongated conductor areas 308 and 309 will be located above the inner cover part. That part of the flexible printed circuit foil containing the elongated conductor areas 308 and 309 can be fastened to the surface of the inner cover part, for instance with an adhesive of with a stick-on film.

Figure 4:
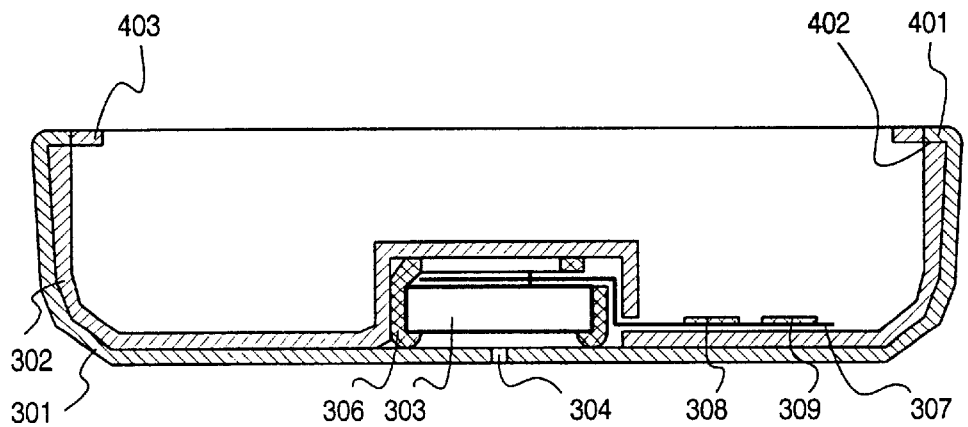
FIG. 4 shows some details of a structure according to FIG. 3.

FIG. 4 is a cross-section of the structure in FIG. 3 taken in a plane which is perpendicular to the motion direction of the cover and which passes through the sound opening of the microphone. The outer cover part 301, the inner cover part 302, the microphone 303, the sound opening 304, the elastic isolating capsule 306, the flexible printed circuit foil 307, and the elongated conductor areas 308 and 309 correspond to the parts shown in FIG. 3. The attachment of the outer and inner cover parts to each other with the aid of a form-fitting joint is presented so that there are projections 401 at certain places of the outer cover part, whereby these projections are bent inwards so that they are pressed into corresponding recesses 402 at the edge of the inner cover part. For the sake of graphical clarity these projections and recesses were not shown in the FIG. 3 above. FIG. 4 shows also how the edges of the inner cover part are bent inwards to form slide bars 403, with the aid of which the structure is fastened to a mobile phone in a sliding manner.

Compared to prior art the structure according to the FIGS. 3 and 4 has many advantages. The cover parts are fastened to each other without any ultrasonic welding or other work step which is difficult to automate. Neither cover part has to be of a material which could be used as such as a part of the mobile phone's cover. When the cover is assembled of two cover parts to be located within each other, the outer cover part can be for instance of some aesthetically appealing material, which however is a disadvantageous material regarding costs, workability and/or rigidity characteristics, and the inner cover part can be of a material which is more advantageous regarding the structural characteristics but more disadvantageous regarding the aesthetic characteristics. For instance, with injection moulding of plastics it is possible to make such details which would be difficult or impossible to make by embossing from metal; on the other hand embossed metal provides easily an aesthetically appealing result. Therefore it is advantageous to make the outer cover part from metal by embossing and the inner cover part from plastics by injection moulding. Of course the cover parts can also be of the same material.

Figure 5:
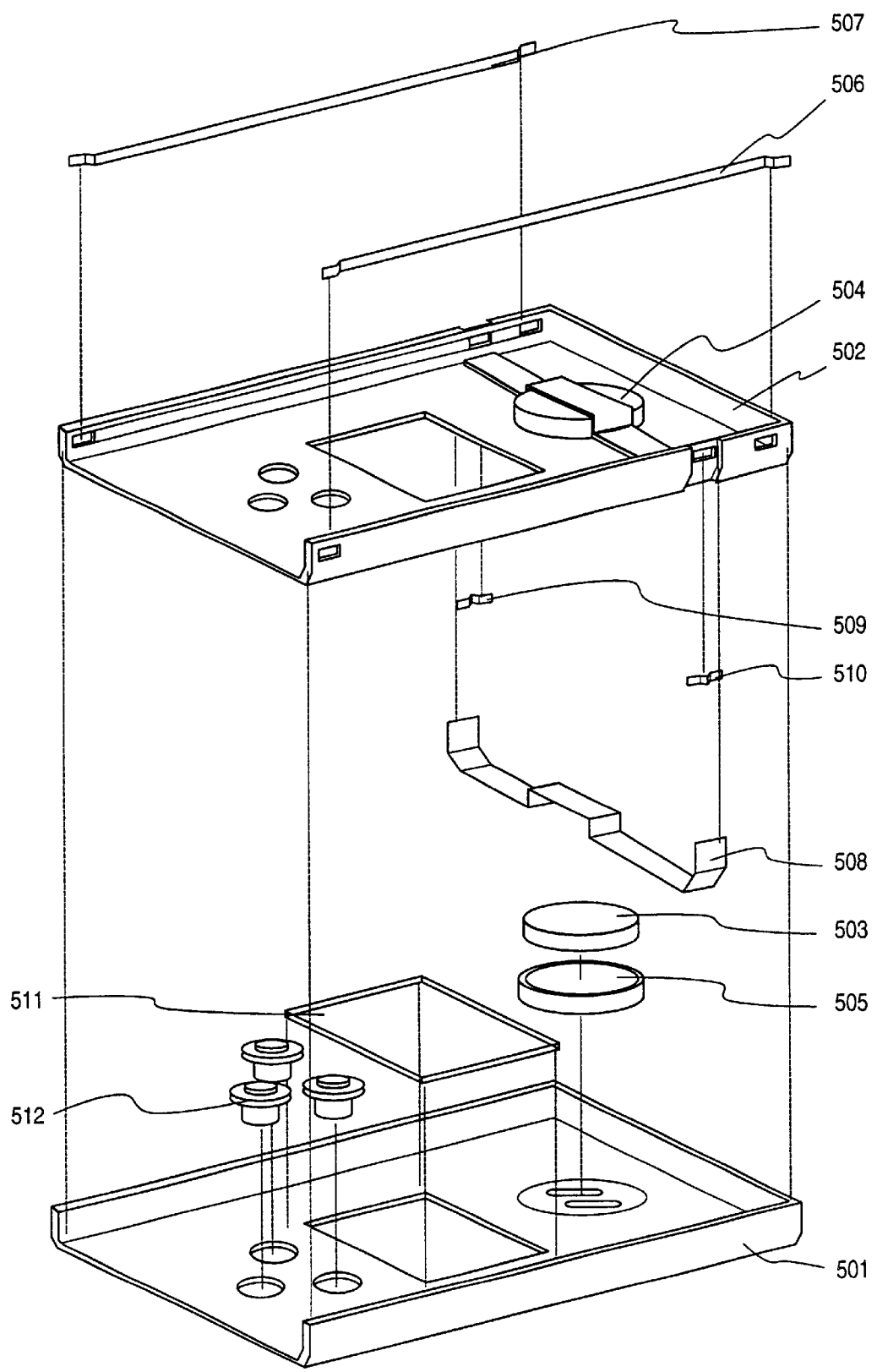
FIG. 5 shows another cover structure according to the invention.

FIG. 5 shows another cover structure according to the invention. This case relates to such a part of a mobile phone's cover which contains the speaker. The cover structure of FIG. 5 comprises an outer cover part 501 and an inner cover part 502 according to the same principle that was presented above in connection with FIG. 3. The cover parts can also contain openings for a display, for keys and/or for other components of the mobile phone. The speaker 503 is mounted in the space left between the cover parts, whereby the shape of the space is defined by the substantially planar form of the outer cover part and a place 504 in the inner cover part particularly shaped for the speaker. An elastic capsule 505 is used to support the speaker in its place and to mechanically isolate it from the cover parts.

In the embodiment according to FIG. 5 the electrical connections between the movable cover part and the rest of the mobile phone are realised with slide conductors 506 and 507 which are connected separately to the inner cover part 502. The electrically conducting connection between the speaker and the slide conductors are realised by a flexible printed circuit foil 508, on the surface of which the required conductor areas (not shown separately in the figure) are formed, and by contact springs 509 and 510 which are placed in the holes in the second cover part so that they contact both the conductor areas on the surface of the flexible printed circuit foil 508 and the slide conductors. Further the FIG. 5 shows how a lens 511 protecting the display and the key rubbers 512 related to the key structure are located between the cover parts. Instead of separate key rubbers it is possible to use a continuous keymat or other key solutions known per se. The invention does not require that any components belonging to the keypad or to the displays should be located between the inner and the outer cover parts.

Figure 6:
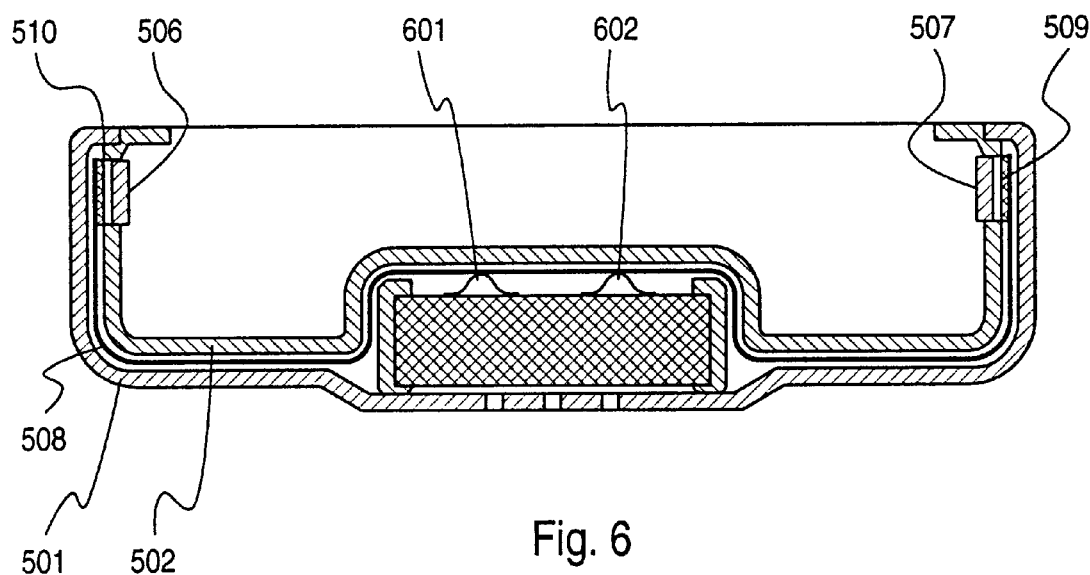
FIG. 6 shows some details of the structure of FIG. 5.

FIG. 6 is a cross-section corresponding to that of FIG. 4 of a structure according to FIG. 5, and it shows in more detail how the cover parts are attached to each other in a similar way as above, based on bendable projections and corresponding recesses, and how the contact springs 509 and 510 are located between the flexible printed circuit foil 508 and the slide conductors 506 and 507. If the spring force caused by the compressed contact springs is sufficient for forming a reliable electrical contact it is not necessary to fasten the flexible printed circuit foil and the slide conductors to each other, for instance by soldering. It is also possible to realise the electrical connection between the flexible printed circuit foil and the speaker with the aid of spring connectors 601 and 602, whereby the assembly of the device does not require even a single soldering work stage. For the sake of clarity the FIG. 6 shows how the slide conductors 506 and 507 slightly project from the inner surface of the inner cover part 502. The structure can be designed so that the surface of the slide conductors is level with the surface of the inner cover part, whereby they are easily kept clean.

In FIG. 5 it was assumed that the slide conductors are mechanically connected to the inner cover part in the assembly phase of the structure by using any mechanical connection method known per se. If the inner cover part is made by injection moulding then it is also possible to place the slide conductors in the injection mould before the injection of the plastics material, whereby they join the inner cover part as so called inserts in connection with the injection moulding. This will further simplify the assembly of the structure.

The separate slide conductors according to the FIG. 5 can be made from a long metal band by cutting sections of a suitable length. Such a metal band can be coated very advantageously compared to the prior art coating of separate flex pieces. It is also possible to use more durable coatings in the coating of the metal band. Further the structure according to the FIGS. 5 and 6 has the same advantages which were described above with reference to the structure according to FIGS. 3 and 4.

The invention does not impose any restrictions on in which part of the cover structure the slide conductors are mounted.

What is claimed is:

1. A cover structure for an electronic device, comprising:
   a first electronic device part and a second electronic device part, the parts being movable in relation to each other,
   within the first electronic device part is an outer cover part and an inner cover part, the outer and inner parts being of substantially the same size and shape, the outer and inner cover parts forming a cover structure of two nested layers,
   further within the first electronic device part is a certain electrical component, located between the inner cover part and the outer cover part, and
   further within the first electronic device part slide conductors on a surface of the inner cover part which is not against the outer cover part, for creating an electrically conducting connection between the first and second electronic device parts.

2. A cover structure according to claim 1, wherein said outer cover part is substantially planar at a location of said electrical component, and said inner cover part comprises a fastening shape at the location of said electrical component in order to create a space with a size and form of said electrical component between said outer cover part and said inner cover part.

3. A cover structure according to claim 1, wherein said outer cover part and said inner cover part are attached to each other with a form-fitting joint.

4. A cover structure according to claim 1, comprising a flexible printed circuit foil for creating an electrical connection between said electrical component and said slide conductors.

5. A cover structure according to claim 4, wherein said slide conductors are located on a surface of said flexible printed circuit foil, and said flexible printed circuit foil extends from a side of said inner cover part which is against said outer cover part to that side which is not against said outer cover part.

6. A cover structure according to claim 4, wherein said flexible printed circuit foil is entirely between said outer cover part and said inner cover part, and the structure additionally comprises means for creating an electrically conducting connection between said flexible printed circuit foil and said slide conductors through said inner cover part.

7. A cover structure according to claim 6, wherein said slide conductors are coated metal bands which are fastened to said inner cover part by a mechanical joint.

8. A cover structure according to claim 6, wherein said slide conductors are coated metal bands which are formed to be a part of said inner cover part in connection with manufacturing of said inner cover part.

9. A cover structure according to claim 1, wherein said outer cover part is made of embossed metal and said inner cover part is made of injection moulded plastics.

* * * * *